June 18, 1963  M. WEISS  3,094,623
RADIATION OPERATED DIMENSIONAL GAGE
Filed June 16, 1961
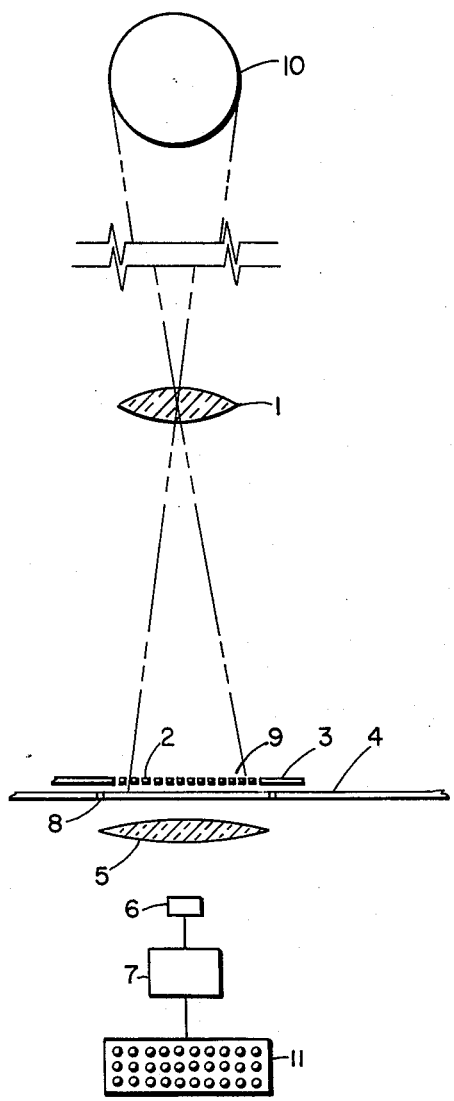
FIG. I
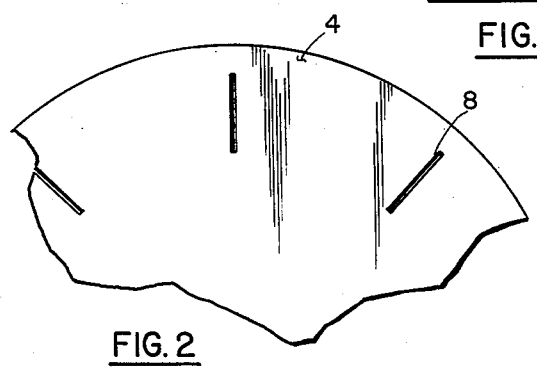
FIG. 2
INVENTOR.
MORRIS WEISS
BY
ATTORNEY

United States Patent Office 3,094,623
Patented June 18, 1963

3,094,623
RADIATION OPERATED DIMENSIONAL GAGE
Morris Weiss, Stamford, Conn., assignor to Barnes Engineering Company, Stamford, Conn., a corporation of Delaware
Filed June 16, 1961, Ser. No. 117,727
6 Claims. (Cl. 250—83.3)

This invention relates to an improved radiation operated dimensional gage with digitalized output.

The problem of measuring the dimensions of objects, sometimes rapidly moving, situated at a distance or of a nature which do not admit of contact gaging is a serious problem. This problem is typified by steel rod and bar mills, the continuous extrusion of hot glass tubing and the like. Because of the temperature and nature of the material it is not practical to gage continuously by devices in contact with the moving object and this has presented a serious manufacturing problem as gaging intermittently or after the material has cooled does not detect inadmissible variations in dimensions in time to prevent spoiled material.

While the extrusion of hot rods or tubes is the most important single field of utility of the present invention it operates by the fact that the material has a very different radiation characteristic from its background and its edges present lines of sharp radiation discontinuity. When the difference lies in temperature the radiation used is ordinarily infrared. However, visible and ultraviolet may also be used where the nature of the material is suitable, for example there may be a difference in color such as a light material passing a dark background or vice versa or the background may be translucent and illuminated from the back the material then presenting a silhouette. The present invention is not concerned with the particular radiation used but for convenience in description its use with extruded hot steel rod will be used as an illustration.

The first real breakthrough in the continuous monitoring of the dimensions of steel rods was effected by the Astheimer infrared gage which is described and claimed in the copending application of Astheimer, Serial No. 9,787, filed February 19, 1960, now U.S. Patent No. 3,003,064, granted October 3, 1961. Essentially this gage utilized a radiation detector, imaging optics and a reticle which scanned a small area across the material to be monitored. This was effected in the Astheimer gage by a rotating reticle with uniformly spaced holes or other means for scanning a small transparent area across the material. The radiation detector produced a signal which, usually after a suitable preamplification, was then processed in electronic circuits which produced a square wave of uniform voltage and width proportional to the material being gaged.

The Astheimer gage has proven to be extremely effective in gaging of materials where there is a sharp radiation discontinuity. However, it is an analog device, that is to say it produces a final signal which is proportional to the dimensions being measured. As a result it shares the disadvantages of all analog devices, namely that their accuracy can be affected by external disturbances and is dependent on some degree of uniformity of the radiation characteristics of the material to be measured. These disadvantages of the Astheimer gage have not prevented its practical success in situations suited for its characteristics. It constitutes an instrument of high effectiveness but like most instruments it is not perfect.

In my copending application Serial No. 108,155, filed May 5, 1961, I have described an improvement on the Astheimer gage in which only the radiation pulses corresponding to the edges of the material are used and after amplification and differentiation trigger an oscillator or counting circuits, the dimension then being proportional to the count of oscillator pulses during the period of time between the triggering pulses. This improvement has been of practical value in overcoming some of the disadvantages of the Astheimer gage for certain uses. However, it in turn does not represent absolute perfection. Certain problems arise most important of which is precise pulse generation which requires extreme precision in operating the pulse oscillator for precision of the measurement depends on the number of pulses in a scan period and hence on the extreme accuracy of the oscillator. It should be remembered that we are dealing with instruments capable of measurements of extreme precision in terms of practical manufacturing processes. Thus, for example the Astheimer gage monitors the dimensions of a steel rod from a quarter to a half an inch within a precision of ±0.001″. At the same time this measurement is being made on material which may be moving at rates up to 90 miles an hour and which may be nonuniform in its radiation characteristics in different places.

The problem of precise oscillator synchronization with scan was solved to a practical degree in my copending application above referred to by producing the oscillator pulses from the scanning reticle of the gage itself, for example the customary reticle which is a disc of moderate size, for example, 5″ to 6″ in diameter is provided with very fine pulse generating segments around its periphery, for example translucent bars which will let light through to actuate a radiation detector or other pulse generating means. In order to obtain accuracy there must be a very large number of pulses, for example, for 0.001″ accuracy there must be more than a thousand pulses in the ordinary scan time. This has presented a very real problem of reticle manufacture and is a problem which increases when still higher accuracy is required. It is with an improved solution of the digitalization problem of my copending application that the present invention relates.

Essentially the present invention produces the oscillator pulses by the scan itself and is completely unaffected and does not involve pulse generation on the scanning mechanism. Greater precision is made possible. The instrument is markedly simplified reducing the number of elements and simplifying the electronic processing circuits. The instrument of the present invention is capable of performing all of the functions of that of my copending application with a reduction in elements and simplification of electronics and also permits precisions beyond what was practical in that pulse generating design.

The scanning mechanism of the Astheimer gage is not substantially altered in principle in the present invention. Essentially the scanning is produced by a reticle with a series of holes and for simplicity this method will be described although, of course, other forms of reticle which scan a small area across the material to be measured may be used.

In the preferred embodiment of the Astheimer gage the holes on the reticle are spaced more widely than the largest dimension of material to be measured. This is also necessary in the present invention. However, the reticle does not require any degree of precision in the uniformity of spacing of the holes in the reticle but preferably they should be very small. This makes for a much more easily manufactured reticle and is one of the advantages, though less important one of the present invention.

The essential feature of the present invention is the interposition in the scanning mask window or for that matter elsewhere in the beam of a very fine grid of alternate segments of radiation transparent and radiation oqaque material. Preferably this grid is located near the plane of the moving reticle to simplify sharp imaging on both pieces of equipment. The grid is stationary and it is rectangular though, of course, the bars do not absolutely need to be. It is possible with ruling engines to rule lines much finer and much more accurately when they are straight than is possible in the periphery of a reticle. The only limitation is set by diffraction and this permits a precision much greater than is possible in a reticle. Ruled grids of extraordinary precision can easily be made and in fact are commercial articles. The holes are also preferably radial lines of size comparable to a grid bar but as the spacing is not important they present no particular problem.

The operation of the present invention can be understood by considering the gaging of a hot rod or tube, it being realized, as has been pointed out above, that all that is needed is a marked radiation difference between the material to be gaged and its background. As the scan starts across the background on one side of the material no pulses are registered for this level of radiation is below that for which the electronic circuits are set. As the scan crosses the edge of the material to be measured there is a sharp discontinuity, the radiation increases to the level for which the circuits are set and as the scan proceeds across the material a series of pulses are produced by the alternate radiation transmitting and opaque lines. Finally when the scan crosses the other edge of the material to be gaged the pulse production ceases.

The light pulses are transformed by the radiation detector into electrical pulses which after suitable amplification, limiting and/or shaping are then counted in conventional electronic counting circuits. The count of the pulses represents the width of the material being gaged. For example, if there are 10,000 lines to the inch on the grid the measurement will be to ±0.0001″ or an order of magnitude greater than the present precision obtained with Astheimer gages. There is no moving part in the oscillator for the grid remains stationary. There is no need for detectors or other electrical elements to generate pulses for this is done automatically by the regular detector which is used in the previous gages. A single detector signal contains all the needed information. The starting and stopping of the pulse train is automatic and is completely unaffected by the rate of rotation of the reticle and electronic circuits are simple, conventional and require many fewer elements than is needed when separate pulse generators are required. In fact there is only one requirement of the electronic circuit namely that the counter reset itself after each count. However, this is also a conventional modification of counting circuits and it is even possible to purchase standard counters with the necessary features.

Final readout must, of course, be appropriate for the counting circuits used. It must have some means of storage or integration over a scan period but this is true of any counter readout where the count repeats and resets itself. The choice of readout is very wide, for example it may be integrating meters or recorders, number tube readout and the like. Of course, the signal which is read out may also be used further, for example if it departs from a predetermined material size it may constitute an error signal which is used with conventional servo mechanisms to control the operation and to return the material to its desired dimensions. This further processing or utilization of the signal which measures width involves mechanisms which are conventional in nature and their particular details form no part of the invention which may be said to cease once there is a counter output proportional to gage dimension. As the details of counter readout or further signal utilization are not affected by the present invention they will not be further described.

It becomes of interest to consider some of the ultimate limitations of the present instrument which incidently point out further advantageous features and increased flexibility. The first limitation is detector response. A detector must be used which will have a response sufficiently rapid so that the pulses of radiation will be transformed accurately into electrical pulses. For maximum precision this makes the use of photoconductive and similar detectors preferable, for example these may be phototubes in the visible or ultraviolet or very near infrared, photoconductors in the somewhat longer infrared and the like. However, the invention is not limited to the use of this type of detector. While ordinary thermistor bolometers are difficult to produce with time constants much less than a millisecond and so would not be useful for maximum precision unless a very slow scanning rate is used, there are other thermistor bolometers made of thin films of semiconductors such as germanium and silicon which are described and claimed in the copending patent of De Waard, Patent No. 2,994,053, dated July 25, 1961. With such bolometers which have time constants of a few microseconds radiation even in the far infrared can be employed. Even where photon responsive detectors are used this does not involve any serious limitation in ordinary use. In most cases either the material itself or its background provides radiations of wavelength sufficiently short to use photon actuated detectors. This includes the useful part of the ultraviolet, all of the visible and the near infrared out to several microns. For special long wave radiations the higher speed thermistor bolometers will be used.

The openings in the reticle are preferably very narrow radial slits. Their transverse dimensions should approximate approximate a small odd number of grid bars as the instrument fails to generate pulses if the slit widths are exactly equal to an even number of bars. The best results are obtained when the slit width is approximately equal to the widest grid bar used. Then for somewhat finer grids the slit width can be made approximately equal to a small odd number of bar widths. It should be noted that the intensity of pulses is not increased by using a wider slit. A width exactly equal to a single bar gives maximum pulse intensity. In most cases a simple reticle with a single slit width suffices. However, where problems are presented by a slit width approximating an even number of bars for certain grids a different reticle can be substituted. Reticle substitution is simple but as pointed out above ordinarily will not be necessary.

When the slit corresponds to the width of one bar the output is in the form of pulses of uniform amplitude and any pulse counting circuit may be used. If the slit corresponds to the width of a larger odd number of bars then it is necessary to include in the processing circuits differentiating means, that is to say, circuits with a sufficiently short time constant so that the counting circuit responds to pulses corresponding either to the leading edge or trailing edge, the other edge must be eliminated. This, however, is conventional in many kinds of pulse counting circuits and presents no serious problem. The preference for a slit width corresponding to one bar of a pattern cycle is merely because it permits somewhat simplified processing and counting circuits. The accuracy is no greater.

Reference has been made to an optical limitation of the present invention on the fineness of the grid which is determined by diffraction phenomena. This is a question of grid element size. In the Astheimer gage the optics produce a very small image which is suitable for small highly sensitive detectors especially when suitable field lenses are used to distribute radiation from the entrance pupil of the system over the detector. In the present invention it is desirable to use optics which produce a large image at the grid. This may mean 1:1 magnification or even an image larger than the material to be gaged. The larger the image the coarser the grid elements can be for the same degree of precision. The possibility of using optical magnification to obtain greater precision with grids which do not introduce serious diffraction problems is a desirable feature of the present invention and adds to its versatility and usefulness. The range in which optical magnification may be used is quite large though, of course not infinite, because when enormous magnifications are encountered instrument and reticle size may become too large and, of course, at the extreme some degradation of image quality may be introduced. However, over a very wide range a marked degree of adjustment is possible including varifocal optics which permit changing magnification at will. Change in degree of precision can be effected by using a different grid or as pointed out above by changing optical magnification or both.

The invention will be described in greater detail in conjunction with the drawings in which:

FIG. 1 is a diagrammatic representation of the instrument, and

FIG. 2 is a plan view of the reticle, partly broken away.

The material to be gaged is shown at 10 and has a radiation characteristic which differs sharply from its background resulting in sharp lines of radiation discontinuity at its edges. The optics, shown diagrammatically as single lens 1, image the material to be gaged on the plane of a grid 2 which is mounted in a window 9 in a mask 3. Behind the window is a reticle 4 provided with radial slits 8. The slit spacing must be greater than the image of the material to be gaged but need not be uniform.

As the reticle turns a small area represented by a slit 8 first moves across the background of the material to be measured, then strikes the edge where there is a sharp discontinuity, a sharp rise in radiation in the case of a hot rod, and starts pulsating light at the higher level. When the scan moves off the other edge these pulsations at the higher radiation level cease. A field lens 5 images the entrance pupil of the system onto a radiation detector 6, for example in the case of a hot steel rod a lead sulfide photoconductor. The output of the detector is a series of pulses starting when the scan crosses one edge of the material to be gaged and ending as it crosses the other. These pulses are processed in electronic systems 7 which are set so that they do not respond to signals from pulsating radiation from the low level radiation of the background. The circuits also include a pulse counter and reset mechanism. The output signal is led through a suitable indicator shown, by way of illustration, decade counter readout 11 which responds to the pulse count in a single train.

It will be apparent that the width of the material gaged is determined only by the number of pulses. Change in reticle speed merely changes frequency but the counting circuits count pulses and over wide ranges are insensitive to frequency changes. When the background produces higher radiation intensity in the material to be measured the readout circuit is changed, the electronic circuits being set so that they respond to the lower level pulses but are disabled by pulses of higher voltage coming from the background.

I claim:

1. In a radiation dimension gage comprising in combination and in optical alignment a mask provided with a window, means for imaging the object to be gaged onto the plane of the window, a radiation detector, means for imaging the window thereon, a moving reticle adjacent the mask and being provided with symmetrical radiation transparent openings to cause a small transparent area to move across the window, the spacing of the openings being greater than the width of the image of the object to be gaged, the improvement which comprises, (a) a fine grid of radiation transmitting and opaque bars in the beam adjacent the reticle, the bars being of a width so that a symmetrical transparent opening approximates in width a small odd number of grid bars, and (b) reset electronic counting means connected to the output of the radiation detector whereby the radiation pulses resulting from the movement of the small transparent area across the grid are counted and means connected to the counting means output to produce a response which is a function of the number of pulses counted in the passage of the transparent area across the image of the object to be gaged.

2. A gage according to claim 1 in which the symmetrical transparent openings are slits.

3. A gage according to claim 1 for gaging material having a temperature different from its background in which the detector is an infrared detector.

4. A gage according to claim 2 in which the detector is an infrared detector.

5. A gage according to claim 1 in which the means for imaging the object on the window produce an image magnification of not less than about 1:1.

6. A gage according to claim 1 in which the means for imaging the object on the window are of the varifocal type.

References Cited in the file of this patent

UNITED STATES PATENTS

| | | |
|---|---|---|
| 2,931,913 | Long | Apr. 5, 1960 |
| 2,975,284 | Osborne | Mar. 14, 1961 |
| 2,981,842 | Kaufold et al. | Apr. 25, 1961 |
| 3,003,064 | Astheimer | Oct. 3, 1961 |